United States Patent
Ju

(10) Patent No.: US 10,170,785 B2
(45) Date of Patent: Jan. 1, 2019

(54) APPARATUS FOR ASSEMBLING FUEL CELL STACK

(71) Applicant: Hyundai Motor Company, Seoul (KR)

(72) Inventor: HoKyun Ju, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 376 days.

(21) Appl. No.: 14/941,369

(22) Filed: Nov. 13, 2015

(65) Prior Publication Data

US 2017/0033392 A1 Feb. 2, 2017

(30) Foreign Application Priority Data

Jul. 31, 2015 (KR) ........................ 10-2015-0108921

(51) Int. Cl.
| | |
|---|---|
| *H01M 8/2404* | (2016.01) |
| *H01M 8/248* | (2016.01) |
| *B23P 19/10* | (2006.01) |
| *B30B 9/00* | (2006.01) |

(52) U.S. Cl.
CPC ......... *H01M 8/2404* (2016.02); *H01M 8/248* (2013.01); *B23P 19/10* (2013.01); *B30B 9/00* (2013.01)

(58) Field of Classification Search
CPC ...... H01M 8/24; H01M 8/2404; H01M 8/248; B23P 19/04; B23P 19/10; B30B 9/00; Y10T 29/49108; Y10T 29/53022; Y10T 29/53135–29/53139
See application file for complete search history.

(56) References Cited

U.S. PATENT DOCUMENTS

| | | | | | |
|---|---|---|---|---|---|
| 4,615,107 | A | * | 10/1986 | Kumeta ................ | H01M 8/247 29/623.1 |
| 5,842,259 | A | * | 12/1998 | Hardesty ............... | B23B 29/323 29/40 |
| 8,574,320 | B2 | * | 11/2013 | Scheuerman ....... | H01M 2/1077 100/35 |

(Continued)

FOREIGN PATENT DOCUMENTS

| | | | | |
|---|---|---|---|---|
| EP | 1753065 A1 | * | 2/2007 | ............ B23P 19/069 |
| JP | 2006-339118 A | | 12/2006 | |

(Continued)

OTHER PUBLICATIONS

Translation of JP2013219028, generated Nov. 28, 2017.*
Translation of KR100969065, generated Nov. 30, 2017.*

*Primary Examiner* — Matthew P Travers
(74) *Attorney, Agent, or Firm* — Mintz Levin Cohn Ferris Glovsky and Popeo, P.C.; Peter F. Corless

(57) ABSTRACT

An apparatus for assembling a fuel cell stack is provided. The apparatus exerts a force on fuel cell components stacked on a stacking guide and couples a pressed stacked body formed of the pressed fuel cell components by a fastening member. The apparatus includes a lift plate that is disposed on an inner bottom of the stacking guide and a press body that is installed on a press frame to be movable in a vertical direction, and exerts a force onto the fuel cell components stacked on the lift plate. A plurality of fixing rods are disposed on the press body and are fastened to the lift plate, and coupled the press body integrally to the lift plate with the pressed stacked body disposed therebetween.

14 Claims, 13 Drawing Sheets

(56) References Cited

U.S. PATENT DOCUMENTS

| | | | | |
|---|---|---|---|---|
| 2006/0006155 | A1* | 1/2006 | Hill | H01M 8/248 219/121.63 |
| 2006/0051651 | A1* | 3/2006 | Rock | H01M 8/00 429/456 |
| 2008/0159842 | A1* | 7/2008 | Kang | H01M 8/244 414/788.1 |
| 2009/0246595 | A1* | 10/2009 | Watanabe | H01M 8/247 429/406 |
| 2012/0005885 | A1* | 1/2012 | Kwok | H01M 8/247 29/760 |
| 2015/0380761 | A1* | 12/2015 | Watanabe | H01M 8/2404 29/623.1 |
| 2016/0013508 | A1* | 1/2016 | Martinchek | H01M 8/2475 429/469 |
| 2016/0322664 | A1* | 11/2016 | Park | H01M 8/2404 |
| 2016/0365598 | A1* | 12/2016 | Ju | H01M 8/2404 |
| 2016/0365599 | A1* | 12/2016 | Ju | H01M 8/248 |

FOREIGN PATENT DOCUMENTS

| | | |
|---|---|---|
| JP | 2013-219028 A | 10/2013 |
| KR | 10-2009-0062955 A | 6/2009 |
| KR | 10-2009-0113429 A | 11/2009 |
| KR | 10-2015-0012562 A | 2/2015 |

* cited by examiner

APPARATUS FOR ASSEMBLING FUEL CELL STACK

CROSS-REFERENCE TO RELATED APPLICATION

This application claims priority to and the benefit of Korean Patent Application No. 10-2015-0108921 filed in the Korean Intellectual Property Office on Jul. 31, 2015, the entire contents of which are incorporated herein by reference.

BACKGROUND (a) Field of the Invention

The present invention relates to an apparatus for assembling a fuel cell stack, and more particularly, to an apparatus for assembling a fuel cell stack, which assembles a fuel cell stack as a fuel cell assembly by pressing stacked fuel cell components.

(b) Description of the Related Art

As is known, a fuel cell stack is a type of electric generator that generates electrical energy through an electrochemical reaction between hydrogen and oxygen using fuel cells. The fuel cell stack is applied to a fuel cell vehicle and includes a fuel cell assembly in which a plurality of fuel cells (e.g., unit cells) are continuously arranged. The fuel cell includes separating plates disposed at both sides of a membrane-electrode assembly (MEA) disposed between the separating plates. The fuel cells may be fastened by end plates and a fastening member when the fuel cells are pressed together. In particular, the fuel cell stack may be assembled through processes of stacking the fuel cells one above another, pressing the stacked fuel cells using a press when the stacked fuel cells are disposed between upper and lower end plates, and fastening the end plates using the fastening member.

In the related art, the fuel cell stack is assembled by stacking the fuel cells using a predetermined guide device, or by dividing the fuel cells into small module units and then stacking the module units as the fuel cells. Furthermore, in the related art, the stacked fuel cell components have a force applied by the press, the stacked body formed of the fuel cell components is fastened, and the stacked body is completely fastened after the force caused by the press is released.

However, in the related art, since the stacked body is completely fastened after pressure caused by the press is released, a leak may occur in the fuel cell stack. For example, a change in repulsive force of the stacked body may cause an assembly quality of the fuel cell stack to deteriorate. In addition, since the stacked body is completely fastened, the entire assembly processes are complex, and a substantial amount of time is required for assembly, thus reducing productivity. Further, in the related art, the stacked body is fastened from a bottom side, which is an inconvenient orientation for a worker.

Moreover, in the related art, a detection is performed to detect the fuel cell stack for airtightness (e.g., an air tight seal) after the stacked body is completely fastened. Accordingly, when the fuel cell stack has a defect in airtightness the fuel cell stack requires disassembly and reassembly.

The above information disclosed in this section is merely for enhancement of understanding of the background of the invention and therefore it may contain information that does not form the prior art that is already known in this country to a person of ordinary skill in the art.

SUMMARY

The present invention provides an apparatus for assembling the fuel cell stack, which may detect airtightness of a stacked body by pressing fuel cell components, and may conveniently fasten the stacked body while maintaining a pressed state of the stacked body.

In one aspect, an exemplary embodiment of the present invention provides an apparatus for assembling a fuel cell stack, which may exert a force on to fuel cell components stacked on a stacking guide, and couple together a pressed stacked body formed of the pressed fuel cell components using a fastening member, the apparatus may include a lift plate positioned on an interior bottom of the stacking guide; a press body installed on a press frame to be movable in a vertical direction, and applies a force to the fuel cell components stacked on the lift plate and a plurality of fixing rods installed on the press body, fastened to the lift plate, and that couple the press body to the lift plate with the pressed stacked body disposed therebetween. The press body may be connected with an operating rod of a press cylinder disposed on the press frame.

A plurality of guide rods, that support and guide the press body in the vertical direction, may be installed on the press frame. The press cylinder may be configured to move the press body in an upward direction via the operating rod, and may be configured to lift the pressed stacked body, coupled between the press body and the lift plate by the fixing rods, to the exterior of the stacking guide.

Another exemplary embodiment of the present invention provides an apparatus for assembling a fuel cell stack, which may exert a force on to fuel cell components stacked on a stacking guide, and couple together a pressed stacked body formed of the pressed fuel cell components by a fastening member, the apparatus may include a lift plate disposed at a bottom side of the stacking guide; a press body installed on a press frame so as to be movable in a vertical direction, and applies a force to the fuel cell components stacked on the lift plate, and a plurality of fixing rods installed on the press body, fastened to the lift plate, and coupled the press body integrally to the lift plate with the pressed stacked body disposed therebetween, in which the press body may include a rotary member coupled to upper end portions of the fixing rods, and disposed to be rotatable by a drive unit.

The rotary member may be rotated by the drive unit s to fasten the fastening member to the pressed stacked body when the pressed stacked body, is fixed between the rotary member and the lift plate by the fixing rods, is lifted to an upper side of the stacking guide by the press body. The drive unit may include a drive motor which coupled (e.g., fixedly installed) to the press body and a rotary shaft coupled at a rotation center of the rotary member, and connected to a driving shaft of the drive motor. A driving gear may be coupled to the driving shaft, and a driven gear may be coupled to the rotary shaft. The driving gear and the driven gear may be coupled together through at least one idle gear. The driving shaft, the rotary shaft, and the idle gear may be rotatably positioned on a support plate fixed to the press body.

A stopper cylinder that restricts the rotary member may be positioned on the press body. The stopper cylinder may include a stopping rod selectively coupled to a stopping groove disposed within the rotary member that operates forward and rearward in the vertical direction. The press body may include support ends which support both sides of an upper portion of the pressed stacked body. The rotary member may be rotatably positioned between the support ends, and may be configured to exert a force (e.g., press) on a portion between both sides of the upper portion of the pressed stacked body. Rounded portions may be formed at both sides of the rotary member that correspond to the support ends. The rotary member may have coupling portions that are coupled to the upper ends of the fixing rod. The lift plate may have coupling apertures that have a shape that corresponds to the rotary member and into which lower ends of the fixing rods are disposed (e.g., fitted).

Further, pin apertures may be formed in lower end portions of the fixing rods, and a fastening pin, which couples together a pair of fixing rods that faces each other in a front and rear direction of the pressed stacked body, may be fastened to the pin apertures. One pair of fixing rods may be coupled to a front edge portion of the rotary member that corresponds to a front surface of the pressed stacked body, and the other pair of fixing rods may be coupled to a rear edge portion of the rotary member that corresponds to a rear surface of the pressed stacked body. The fastening pin may be fastened to the pin aperture in the front and rear direction of the pressed stacked body through a pin supporting groove disposed in a bottom surface of the stacking guide.

In another exemplary embodiment of the present invention, an apparatus for assembling a fuel cell stack, which may be configured to exert a force on fuel cell components stacked on a stacking guide, and couples together a pressed stacked body formed of the pressed fuel cell components by a fastening member, may include a lift plate disposed at a bottom side of the stacking guide, a press body positioned on a press frame to translate (e.g., be movable) in a vertical direction, and may be configured to exert a force on the fuel cell components stacked on the lift plate. Further included may be a plurality of fixing rods positioned on the press body, fastened to the lift plate, and that couple the press body integrally to the lift plate with the pressed stacked body disposed therebetween and an airtightness detection unit may be positioned to connect the press body and the stacking guide. The airtightness of the pressed stacked body may be detected by supplying a fluid to the pressed stacked body when the fuel cell components are pressed by the press body. The airtightness detection unit may be configured to supply air to the pressed stacked body through the press body and the stacking guide, and measure the amount of leaking air.

In the exemplary embodiments of the present invention, airtightness of the pressed stacked body may be detected prior to attaching the fastening member the pressed stacked body, and the pressed stacked body may be coupled together (e.g., fastened) by the fastening member while maintaining a pressed state of the fuel cell components. Therefore, in the exemplary embodiment of the present invention, since the pressed stacked body, are maintained in a pressed state by the lift plate, the press body, and the fixing rods, is fastened, a leak of the fuel cell stack attributed to a change in repulsive force of the pressed stacked body may be reduced or eliminated. Further, the assembly processes maybe simplified, and may reduce assembly time, thereby improving assembly productivity of the fuel cell stack.

Additionally, in the exemplary embodiment of the present invention, the pressed stacked body may be coupled together while being rotated when the pressed stacked body, which is maintained in a pressed state by the lift plate, the press body, and the fixing rods, is lifted up, thereby improving convenience in fastening the fuel cell stack. Furthermore, in the exemplary embodiment of the present invention, airtightness of the pressed stacked body may be detected by the airtightness detection unit before the pressed stacked body. For example in a pressed state, the press stacked body may be fastened, and as a result, unlike the related art, disassembling the fuel cell stack to repair the fuel cell stack when a defect is detected in the fuel cell components in airtightness may be avoided.

BRIEF DESCRIPTION OF THE DRAWINGS

The above and other objects, features and other advantages of the present invention will be more clearly understood from the following detailed description when taken in conjunction with the accompanying drawings.

DETAILED DESCRIPTION

Figure 1:
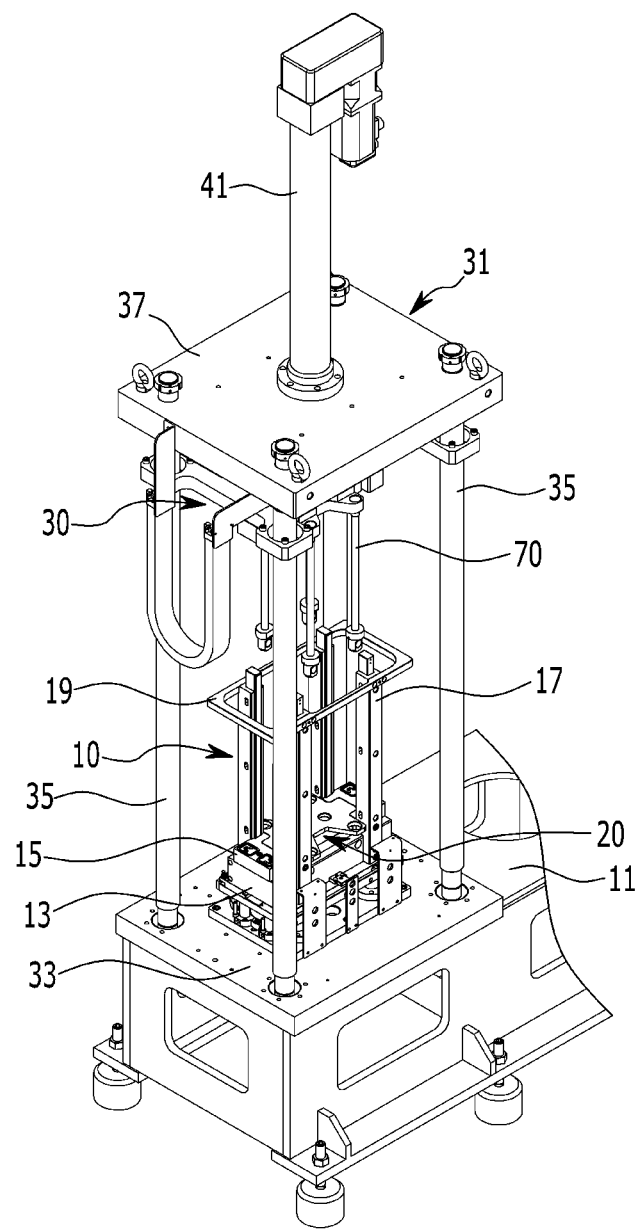
FIG. 1 is an exemplary perspective view illustrating an apparatus for assembling a fuel cell stack according to an exemplary embodiment of the present invention.

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The size and thickness of each component illustrated in the drawings are arbitrarily shown for understanding and ease of description, but the present invention is not limited thereto. Thicknesses of several portions and regions are enlarged for clear expressions. In the present specification, names of constituent elements are classified as a first . . . , a second . . . , and the like so as to discriminate the constituent elements having the same name, and the names are not essentially limited to the order in the description below. In addition, the term "unit", "means", "part", "member", or the like, which is described in the specification, means a unit of a comprehensive configuration that performs at least one function or operation.

Figure 2:
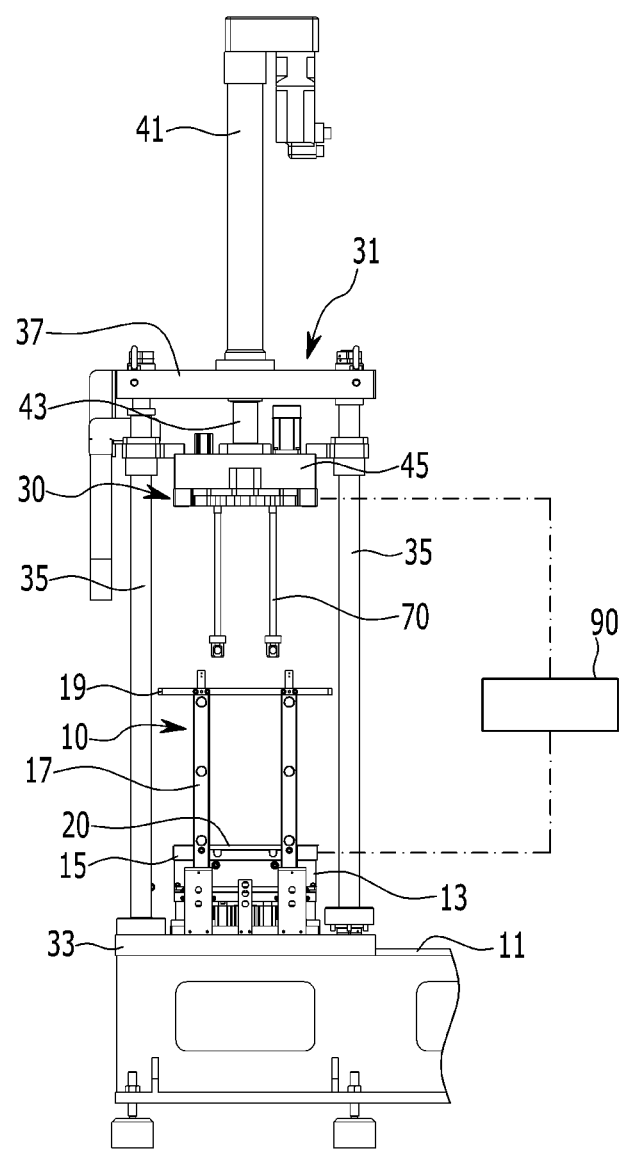
FIG. 2 is an exemplary side configuration view illustrating the apparatus for assembling the fuel cell stack according to the exemplary embodiment of the present invention.

FIG. 1 is an exemplary perspective view that illustrates an apparatus for assembling a fuel cell stack according to an exemplary embodiment of the present invention. FIG. 2 is an exemplary side configuration view illustrating the apparatus for assembling the fuel cell stack according to the exemplary embodiment of the present invention. Referring to FIGS. 1 and 2, an apparatus 100 for assembling a fuel cell stack according to an exemplary embodiment of the present invention may be used to assemble a fuel cell stack 1 (see FIG. 3) by applying a force to (e.g., pressing) and coupling (e.g., fastening) multiple sheets of fuel cells that may be sequentially stacked.

Figure 3:
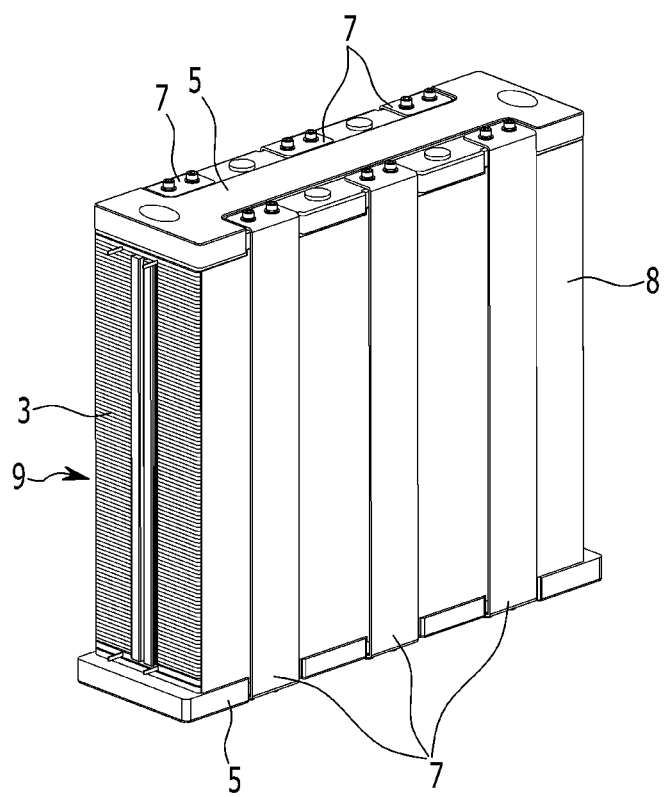
FIG. 3 is an exemplary view illustrating the fuel cell stack to be assembled by the apparatus for assembling the fuel cell stack according to the exemplary embodiment of the present invention.

As illustrated in FIG. 3, the fuel cell stack 1, assembled by the apparatus 100 may include fuel cell components 3 that are continuously stacked and fastening member 7 that are coupled to the fuel cell components 3. For example, the fuel cell components 3 may include separating plate components having negative electrode metal separating plates and positive electrode metal separating plates attached to each other and membrane-electrode assembly (MEA) sheet components having gas diffusion layers (GDL) attached to both sides of membrane-electrode assemblies (MEA).

In the exemplary embodiment of the present invention, the fuel cell components 3 may include a structure having multiple sheets of separating plate components and the MEA sheet components may be continuously stacked in a vertical direction, and end plates 5 may be disposed at upper and lower sides of the fuel cell components 3. The end plates 5 may include components that support the multiple sheets of separating plate components and the MEA sheet components at uppermost and lowermost sides of the multiple sheets of separating plate components and the MEA sheet components. Accordingly, the end plates 5 may be referred to as the fuel cell components 3 hereinafter.

The fastening member 7 may include fastening brackets in the form of a bar that integrally attaches (e.g., fastens) the fuel cell components 3, and may attach to the upper and lower end plates 5 of the fuel cell components 3 under a force (e.g., pressed) by predetermined pressure. Further, in the exemplary embodiment of the present invention, a configuration in which the fuel cell components 3 are pressed by predetermined pressure may be defined as a pressed stacked body 9, and a configuration in which the fastening members 7 are fastened to the pressed stacked body 9 may be defined as the fuel cell stack 1.

Non-described reference numeral 8 in FIG. 3 indicates insulating plates that may be disposed on front and rear surfaces of the pressed stacked body 9 (based on the drawing), respectively, and may be attached to the front and rear surfaces of the pressed stacked body 9 by the fastening member 7. The apparatus 100 for assembling the fuel cell stack according to the exemplary embodiment may include a structure that enables airtightness (e.g., an air tight seal) of the pressed stacked body 9 to be detected prior to the fastening member 7 attachment to the pressed stacked body 9. In particular, the pressed stacked body 9 maybe attached by the fastening member 7 when a force is exerted onto the fuel cell components 3 (e.g., are pressed). For example, as illustrated in FIGS. 1 and 2, the apparatus 100 for assembling the fuel cell stack according to the exemplary embodiment may include a lift plate 20, a press body 30, fixing rods 70, and an airtightness detection unit 90.

The fuel cell components 3 may be pressed by the apparatus 100 when the fuel cell components 3 are stacked on a stacking guide 10 by a separate component stacking device (not illustrated in the drawings). For example, the stacking guide 10 may include a guide device for stacking the fuel cell components 3 in the vertical direction, and may be conveyable on a base frame 11 along a predetermined route (e.g., trajectory). Specifically, the stacking guide 10 may include a bottom body 13 having a quadrangular shape, a support body 15 disposed (e.g., fixedly installed) on an upper surface of the bottom body 13 and supports the fuel cell components 3, and a plurality of guide bodies 17 (see FIG. 4) uprightly positioned on the bottom body 13, supports edges of the support body 15, and guides the fuel cell components 3. Further, the guide body 17 may be formed as a bar and a quadrangular open frame 19, that supports upper end portions of the guide bodies 17 and guides the fuel cell components 3 to the support body 15, and may be positioned on the upper end portions of the guide bodies 17.

Furthermore, the base frame 11 may support the apparatus 100 for assembling the fuel cell stack according to the exemplary embodiment, and may be a single frame or a plurality of frames. Various types of accessory elements, for supporting the apparatus 100 for assembling the fuel cell stack, such as various types of brackets, bars, rods, plates, housings, cases, and blocks, may be positioned on the base frame 11. However, since the various types of accessary elements may be used to install constituent elements of the apparatus 100 for assembling the fuel cell stack that will be described below to the base frame 11, the accessary elements may be referred to as the base frame 11 in the exemplary embodiment of the present invention except for an exceptional case.

Figure 4:
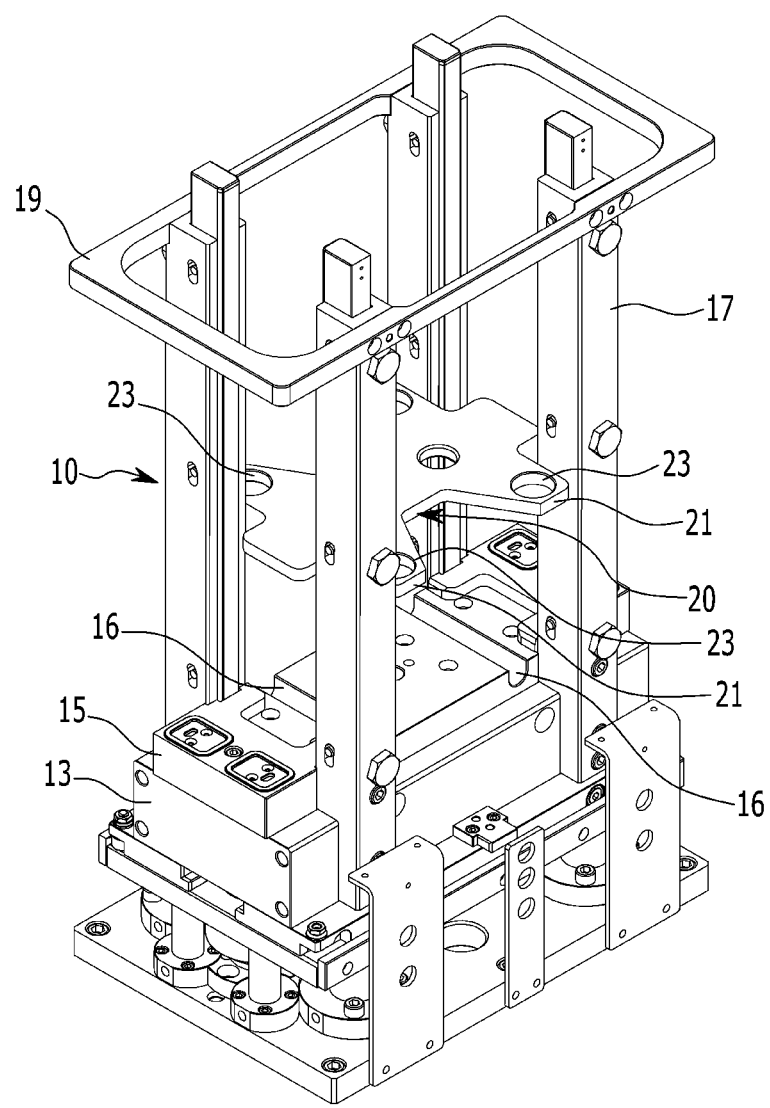
FIG. 4 is an exemplary view illustrating a lift plate portion applied to the apparatus for assembling the fuel cell stack according to the exemplary embodiment of the present invention.

In the exemplary embodiment of the present invention, the lift plate 20 may be placed on an upper surface of the support body 15 by being guided by the guide bodies 17 of the stacking guide 10, and may support the fuel cell components 3. In other words, the lift plate 20 may support the end plate 5 positioned at a lowermost side of the fuel cell components 3. As illustrated in FIG. 4, the lift plate 20 may include protrusions 21 that extend from a plurality of sides of a front edge and a plurality of sides of a rear edge. The protrusions 21 support the guide bodies 17, and the lift plate 20 may translate (e.g., be moved) upward while being guided along the guide bodies 17 by the protrusions 21. Further, the protrusions 21 may include coupling apertures 23 into which lower ends of the fixing rods 70, which will be described above, may be fitted.

In the exemplary embodiment of the present invention, the press body 30 may press the fuel cell components 3 stacked on the lift plate 20 of the stacking guide 10. The press body 30 may be positioned on a press frame 31 to be reciprocally movable in the vertical direction. For example, the press frame 31 may be positioned on the base frame 11. The press frame 31 may include a quadrangular lower plate 33 fixedly positioned on an upper surface of the base frame 11, guide rods 35 positioned upright in the vertical direction at corner portions of the lower plate 33, and a quadrangular upper plate 37 fixed on upper end portions of the guide rods 35.

The guide rods 35 may support and guide the press body 30 in the vertical direction, the lower end portions of the guide rods 35 may be coupled to the corner portions of the lower plate 33, respectively. The upper end portions of the guide rods 35 may be coupled to the corner portions of the upper plate 37, respectively. The press body 30 may be fitted with the guide rods 35, and positioned to be reciprocally movable in the vertical direction along the guide rods 35 by forward and rearward operations of the press cylinder 41. The press cylinder 41 may be positioned on the upper plate 37 of the press frame 31, and may include an operating rod 43 that penetrates the upper plate 37 and operates forward and rearward in the vertical direction. The press body 30 may be connectedly positioned at a tip (lower end) of the operating rod 43.

Figure 5:
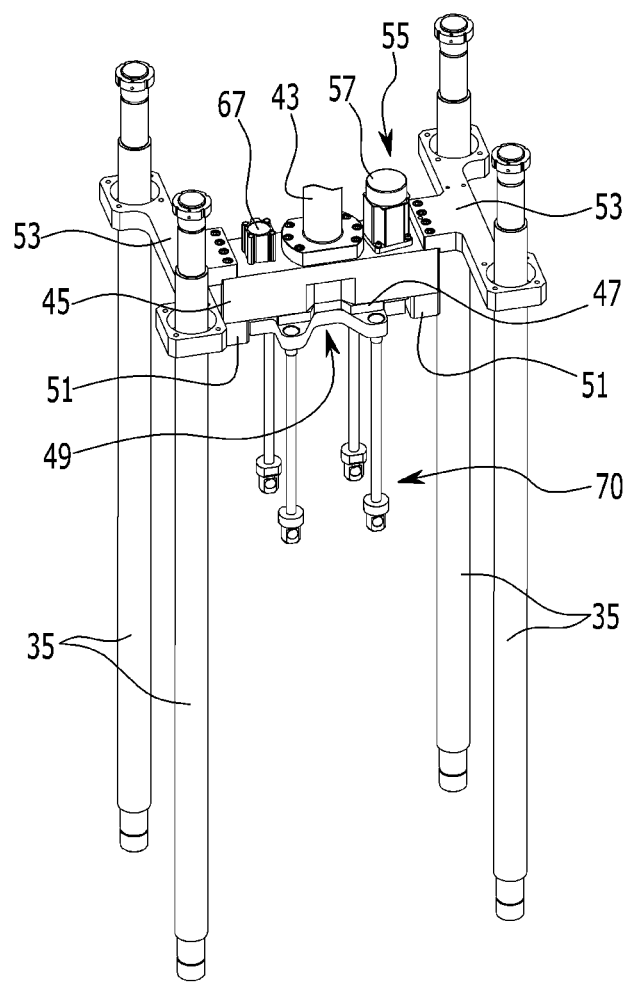
FIG. 5 is an exemplary perspective view illustrating a press body applied to the apparatus for assembling the fuel cell stack according to the exemplary embodiment of the present invention.
Figure 6:
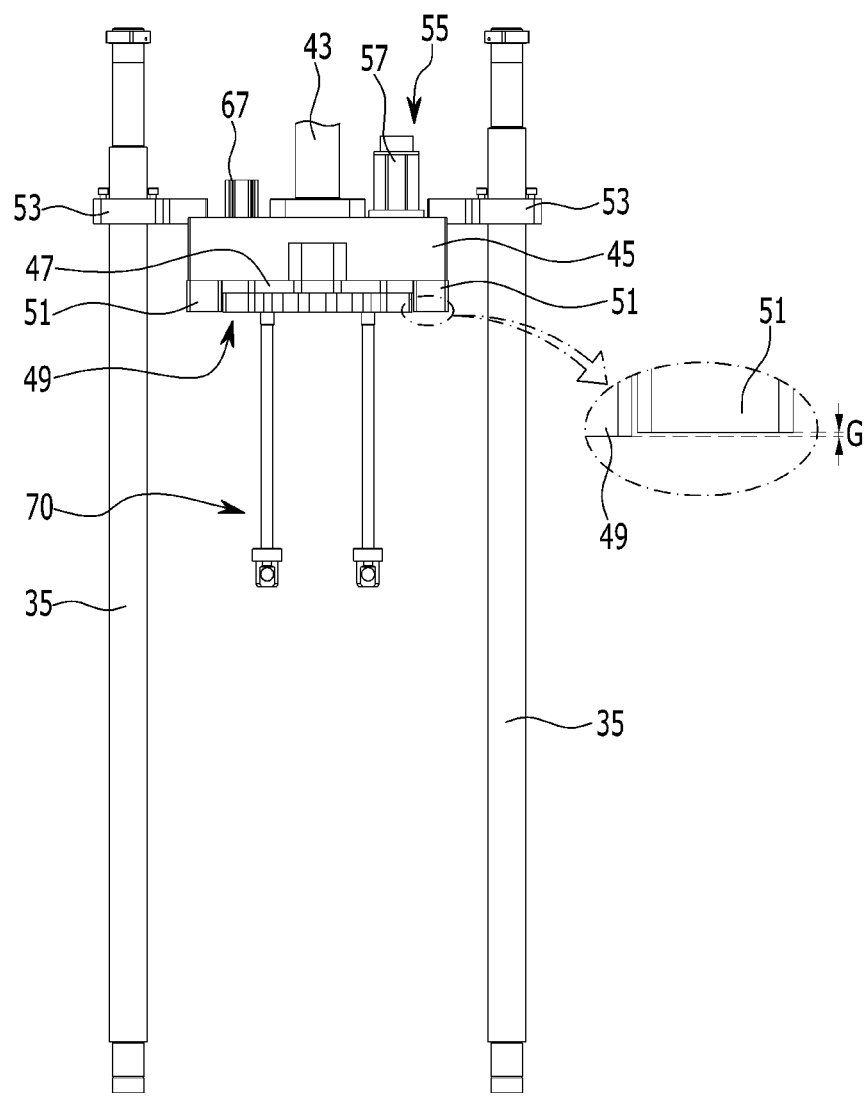
FIG. 6 is an exemplary side configuration view of FIG. 5 according to the exemplary embodiment of the present invention.
Figure 7:
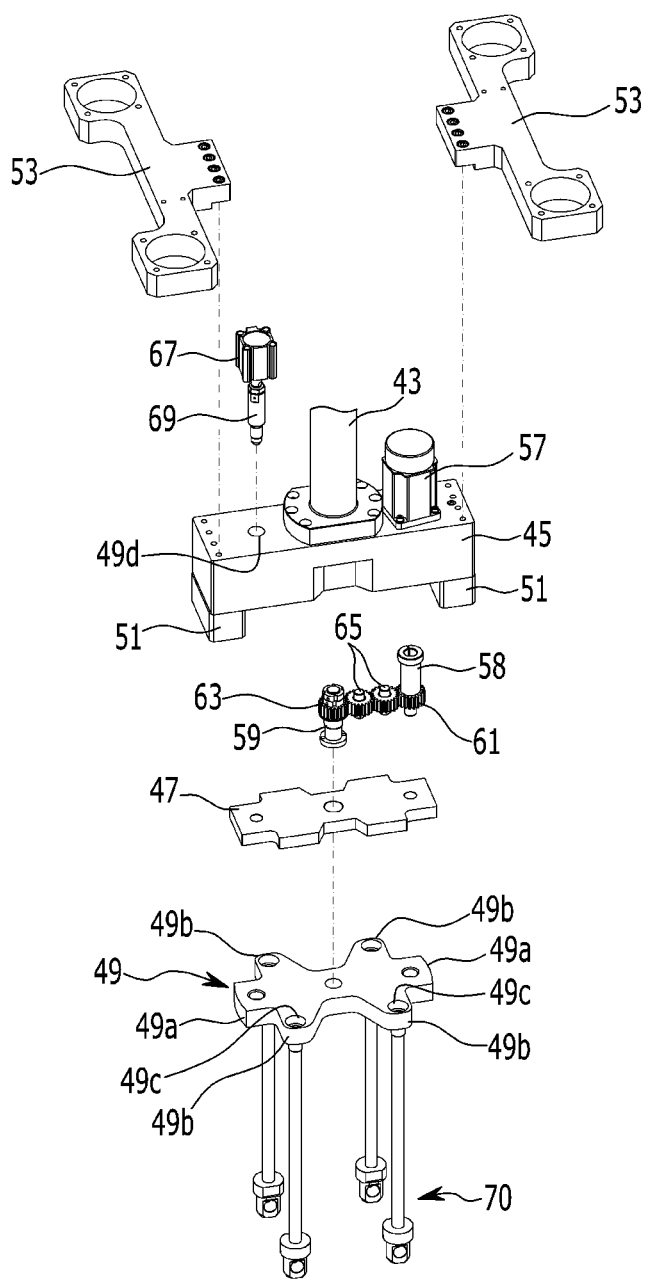
FIG. 7 is an exemplary detailed view illustrating a press body applied to the apparatus for assembling the fuel cell stack according to the exemplary embodiment of the present invention.

FIG. 5 is an exemplary perspective view that illustrates the press body applied to the apparatus for assembling the fuel cell stack according to the exemplary embodiment of the present invention. FIG. 6 is an exemplary side configuration view of FIG. 5. FIG. 7 is an exemplary detailed view that illustrates the press body applied to the apparatus for assembling the fuel cell stack according to the exemplary embodiment of the present invention.

Referring to FIGS. 5 to 7, the press body 30 according to the exemplary embodiment of the present invention may include a press block 45, a support plate 47, and a rotary member 49. The press block 45 may receive forward and rearward operating force from the press cylinder 41 and as the operating rod 43 of the press cylinder 41 operates forward. Further, the press block 45 may provide predetermined pressing force to the upper end plate 5 of the fuel cell components 3 stacked on the stacking guide 10. The press block 45 may be coupled to the tip of the operating rod 43 of the press cylinder 41. Support ends 51 that support a plurality of sides of the upper end plate 5, may be positioned at both sides of a lower surface of the press block 45.

In addition, guide blocks 53 may be coupled (e.g., fixedly installed) at a plurality of (e.g., both) sides of an upper surface of the press block 45, respectively, and the guide blocks 53 may be fitted with the guide rods 35 of the press frame 31. In other words, the guide blocks 53 may be fitted with the guide rods 35, and the press block 45 may reciprocally translate (e.g., move) in the vertical direction while being guided by the guide rods 35 by the forward and rearward operations of the press cylinder 41. The support plate 47 supports the rotary member 49, which will be further described below, and may be coupled to (e.g., fixedly installed) on the lower surface of the press block 45 between the support ends 51 of the press block 45. In the exemplary embodiment of the present invention, the rotary member 49 may be rotatably disposed on the press block 45 by the support plate 47, and positioned on the lower surface of the support plate 47 to be rotatable by a drive unit 55.

The rotary member 49 may have a shape that corresponds to the aforementioned lift plate 20, and may be rotatably positioned on the support plate 47 between the support ends 51 of the press block 45. The rotary member 49 may be configured to exert a force (e.g., press) on a portion between a plurality of sides (e.g., both) sides of the upper end plate 5 of the fuel cell components 3 between the support ends 51. The rotary member 49 may have a plate shape that may be configured to exert a force (e.g., press) on a portion between both sides of the upper end plate 5, and has rounded portions 49a formed at both sides that correspond to the support ends 51 of the press block 45. The rounded portions 49a may be formed at both sides of the rotary member 49 and may allow the rotary member 49 to be smoothly rotated between the support ends 51.

Further, the rotary member 49 may include coupling portions 49b coupled to the upper end portions of the fixing rods 70 that will be further described below. For example, one pair of coupling portions 49b may be formed at a front edge portion of the rotary member 49, and a second pair of coupling portions 49b may be formed at a rear edge portion of the rotary member 49. Fixing apertures 49c into which the upper end portions of the fixing rods 70 may be fitted and fixed are formed within the coupling portions 49b, respectively. The coupling portions 49b support the guide bodies 17 of the stacking guide 10, and the rotary member 49 may translate (e.g., be moved) while being guided in the vertical direction along the guide bodies 17 via the coupling portions 49b.

The drive unit 55 may include a drive motor 57 that may be fixedly installed on the press block 45 of the press body 30, and a rotary shaft 59 coupled to a rotation center of the rotary member 49 and substantially coupled to a driving shaft 58 of the drive motor 57. The driving shaft 58 of the drive motor 57 may be rotatably disposed on the support plate 47 by the press block 45. The rotary shaft 59 may be rotatably supported by the support plate 47, and fixed at a rotation center of the rotary member 49. Further, a driving gear 61 may be coupled to the driving shaft 58 of the drive motor 57, and a driven gear 63 may be coupled to the rotary shaft 59. The driving gear 61 and the driven gear 63 may be coupled to each other by at least one, for example, two idle gears 65. In other words, the driving shaft 58, the rotary shaft 59, and the gears 61, 63, and 65 may be disposed within the interior of the press block 45, and rotatably disposed on the support plate 47.

In the exemplary embodiment of the present invention, when the driving shaft 58 is rotated by an operation of the drive motor 57, the rotary shaft 59 may be rotated by the driving gear 61, the idle gear 65, and the driven gear 63 coupled (e.g., fastened) to each other, and the rotary member 49 may be rotated between the support ends 51 of the press block 45 by the rotary shaft 59. Therefore, in the exemplary embodiment of the present invention, the rotary member 49 may be rotated by the drive unit 55 when the pressed stacked body 9 is fixed between the rotary member 49 and the lift plate 20 by the fixing rods 70 which will be further described below. The pressed stacked body 9 may be lifted toward an upper side of the stacking guide 10 by the press block 45.

Therefore, in the exemplary embodiment of the present invention, the aforementioned insulating plate 8 and the fastening member 7 may be fastened to the pressed stacked body 9. The pressed stacked body 9 may rotate by the rotary member 49 when the pressed stacked body 9 is lifted toward the upper side of the stacking guide 10. Further, a predetermined gap G may be formed between a lower surface of the rotary member 49 and lower surfaces of the support ends 51. In other words, the gap G may be formed between the lower surfaces of the support ends 51 and an upper surface of the upper end plate 5 in contact with the lower surface of the rotary member 49. The gap G may be formed between the lower surface of the rotary member 49 and the lower surfaces of the support ends 51 as described above to avoid interference between the pressed stacked body 9 and the support ends 51 when the lifted pressed stacked body 9 rotates by the rotary member 49.

Conversely, a stopper cylinder 67 that restricts the rotary member 49 may be installed on the press block 45 of the press body 30. The stopper cylinder 67 may include a stopping rod 69 which operates forward and rearward in the vertical direction by means of the press block 45 and the support plate 47. The stopping rod 69 may be selectively coupled to a stopping groove 49*d* formed in the upper surface of the rotary member 49 that operates forward and rearward in the vertical direction by the press block 45 and the support plate 47. In other words, the stopping rod 69 may be withdrawn from the stopping groove 49*d* while operating rearward during the rotation of rotary member 49, and may be coupled to the stopping groove 49*d* while operating forward during completion of the rotation of the rotary member 49.

Figure 8A:
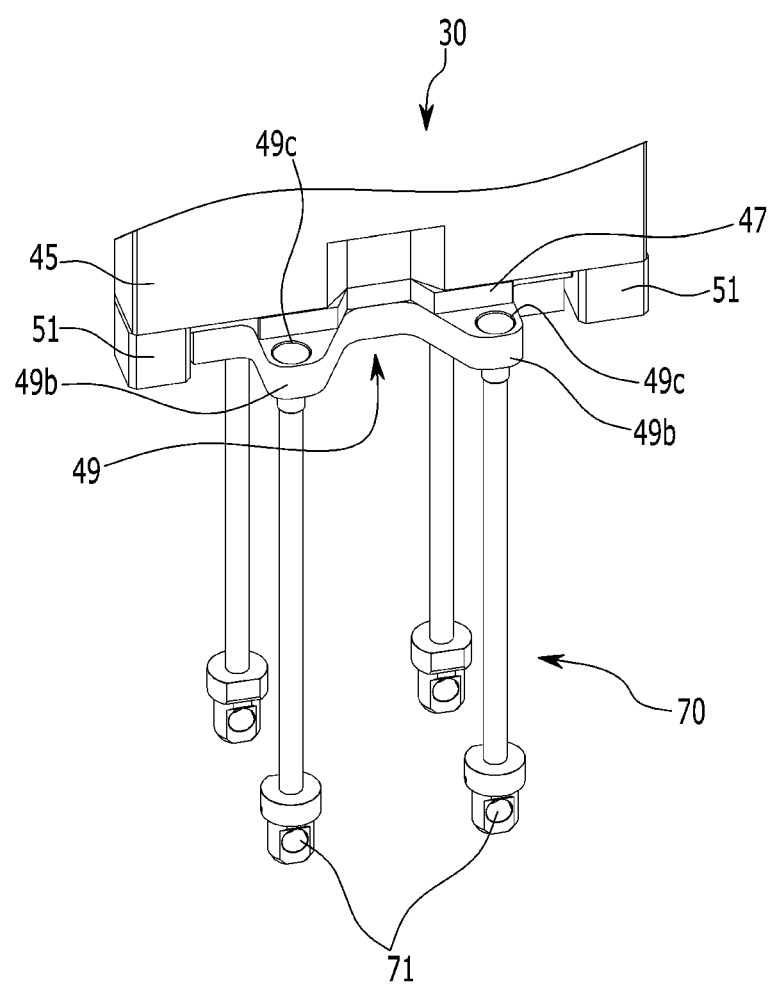
FIGS. 8A and 8B are exemplary views illustrating fixing rods applied to the apparatus for assembling the fuel cell stack according to the exemplary embodiment of the present invention.
Figure 8B:
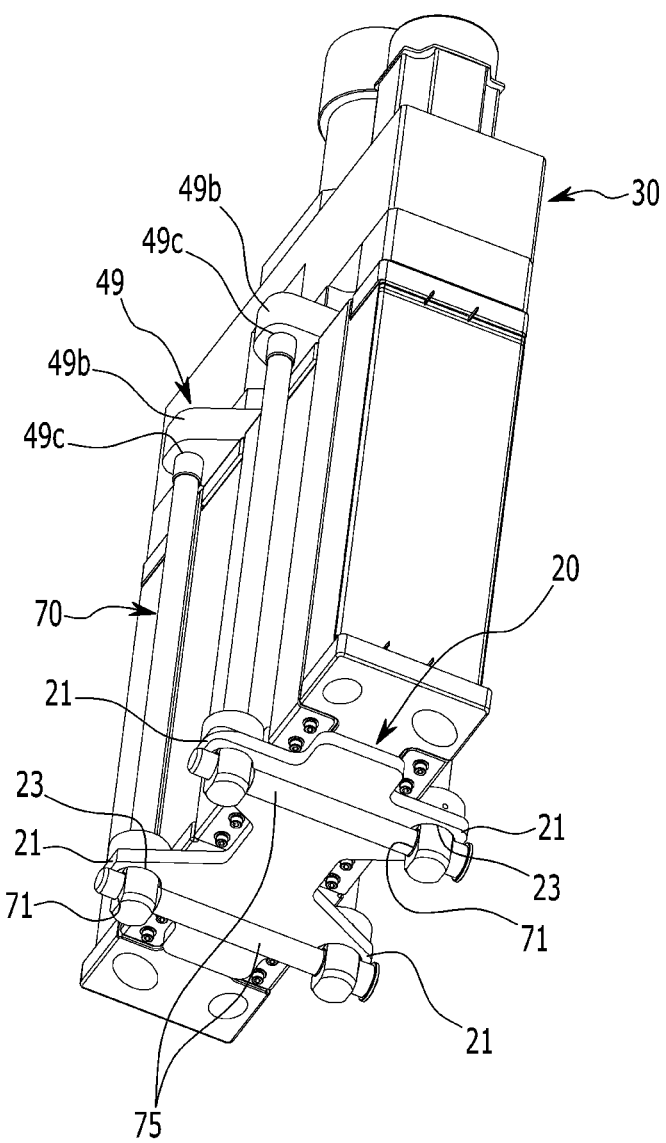

Referring to FIGS. 8A and 8B together with FIGS. 1 and 2, in the exemplary embodiment of the present invention, the fixing rods 70 may couple the press body 30 integrally to the lift plate 20 with the aforementioned pressed stacked body 9 disposed therebetween. A first pair of fixing rods 70 may be coupled to a front edge portion of the rotary member 49, and a second pair of fixing rods 70 may be coupled to a rear edge portion of the rotary member 49 (see FIG. 7). The fixing rods 70 may be positioned on the rotary member 49 of the press body 30, and may be fastened to the lift plate 20. The upper end portions of the fixing rods 70 may be coupled to the coupling portions 49*b* of the rotary member 49, and may be fixed by being fitted into the fixing apertures 49*c* of the coupling portions 49*b*. Further, the lower end portions of the fixing rods 70 may be coupled to the aforementioned protrusions 21 of the lift plate 20, and may be fitted into the coupling apertures 23 of the protrusions 21 (see FIGS. 4 and 7).

For example, a pin aperture 71 may be formed in the lower end portion of the fixing rod 70. When the lower end portion of the fixing rod 70 is fitted into the coupling aperture 23 of the protrusion 21, a fastening pin 75, which couples together a pair of fixing rods 70 adjacent to each other in a front and rear direction of the pressed stacked body 9, may be fastened to the pin aperture 71 of the lower end portion. In particular, the fastening pins 75 may be fastened to the pin apertures 71 of the fixing rods 70 in the front and rear direction of the pressed stacked body 9 through pin supporting grooves 16 (see FIG. 4) disposed in the support body 15 of the stacking guide 10.

Referring to FIG. 2, in the exemplary embodiment of the present invention, the airtightness detection unit 90 may be configured to detect airtightness of the pressed stacked body 9 and supply a fluid to the pressed stacked body 9 formed of the fuel cell components 3 when the fuel cell components 3 are pressed inside the stacking guide 10 by the press body 30. The airtightness detection unit 90 may be positioned to be connected with the press block 45 of the press body 30 and the support body 15 of the stacking guide 10 through fluid tubing. The airtightness detection unit 90 may detect airtightness of the pressed stacked body 9, for example, by supplying air to the pressed stacked body 9 through the press block 45 and the support body 15 and may be configured to measure the amount of leaking air.

Figure 9:
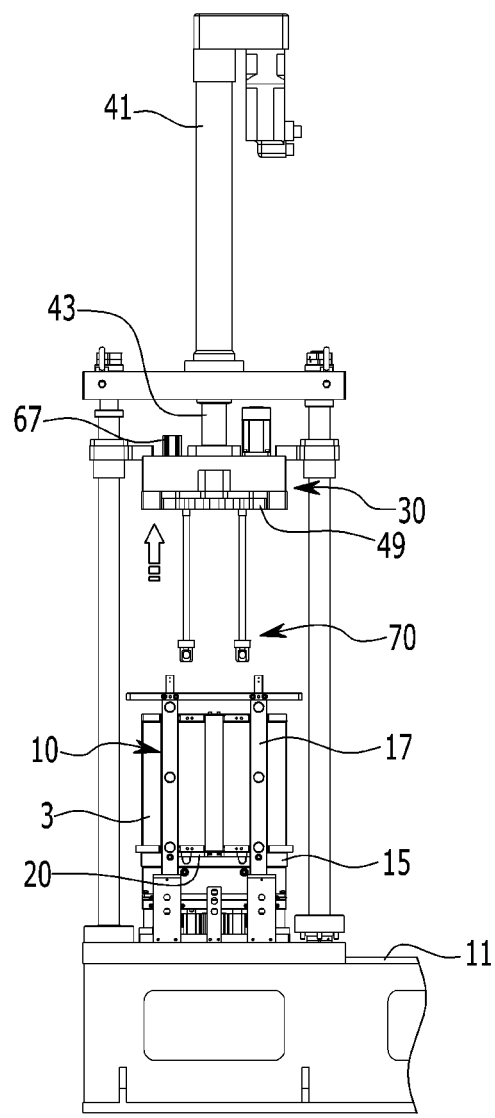
FIGS. 9 to 12 are exemplary views for explaining an operation of the apparatus for assembling the fuel cell stack according to the exemplary embodiment of the present invention.

Hereinafter, an operation of the apparatus 100 for assembling the fuel cell stack according to the exemplary embodiment of the present invention, which is configured as described above, will be described in detail with reference to the aforementioned drawings and the accompanying drawings. FIGS. 9 to 12 are exemplary views for illustrating an operation of the apparatus for assembling the fuel cell stack according to the exemplary embodiment of the present invention. Referring to FIG. 9, in the exemplary embodiment of the present invention, during the stacking of the fuel cell components 3 on the stacking guide 10 by a component stacking device, the stacking guide 10 may translate to a lower side of the press body 30 along a trajectory (e.g., conveying route) of the base frame 11.

In particular, the fuel cell components 3 may be stacked on the support body 15 along the guide bodies 17 of the stacking guide 10, and stacked on the lift plate 20 disposed on the upper surface of the support body 15 within the stacking guide 10. The press body 30 may be moved to an upper side of the stacking guide 10 by the operating rod 43 through a rearward operation of the press cylinder 41. In other words, the lower end portions of the fixing rods 70 may be positioned at an upper side (e.g., exterior) of the stacking guide 10 when the upper end portions of the fixing rods 70 are fixed to the rotary member 49 of the press body 30. Further, the stopping rod 69 of the stopper cylinder 67 may be fitted into the stopping groove 49*d* of the rotary member 49 while operating forward, thereby restricting the rotary member 49.

Figure 10:
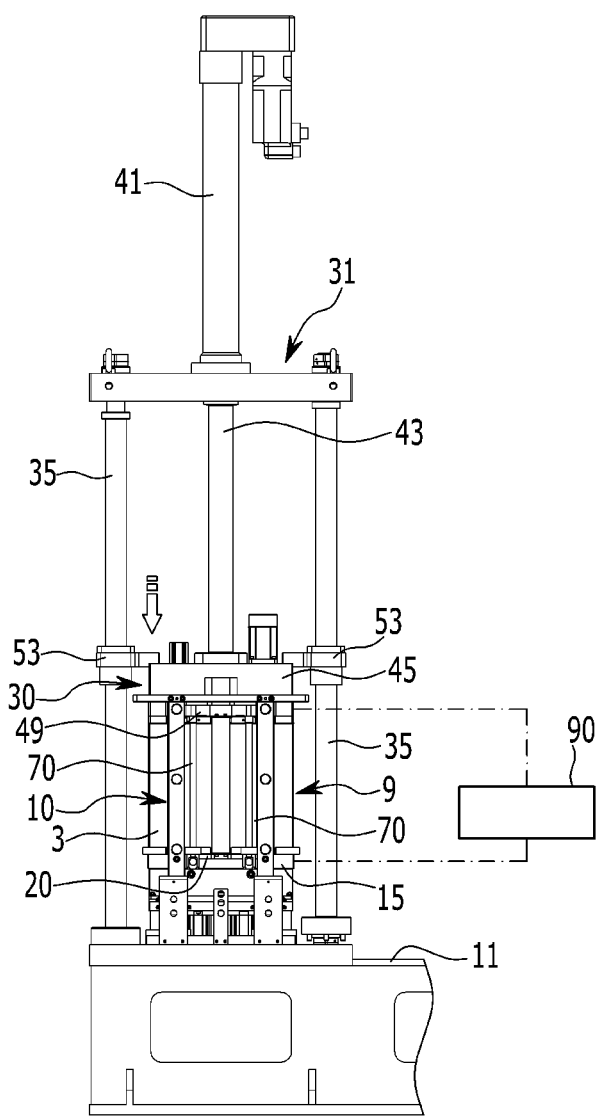

For example, in the exemplary embodiment of the present invention, as illustrated in FIG. 10, the operating rod 43 of the press cylinder 41 may operate forward to move the press body 30 in the downward direction. In particular, the press block 45 of the press body 30 may move in the downward direction by the operating rod 43 of the press cylinder 41. The guide blocks 53 may be fixed to the press block 45 to move in the downward direction while being guided along the guide rods 35 when the guide blocks 53 are fitted with the guide rods 35 of the press frame 31.

Additionally, the press body 30 translates to the interior of the stacking guide 10 through the open frame 19 of the stacking guide 10, and the fuel cell components 3 stacked on the stacking guide 10 may be pressed by the rotary member 49 of the press body 30. During this process, the lower end portions of the fixing rods 70 may be disposed within (e.g., fitted into) the coupling apertures 23 of the protrusions 21 of the lift plate 20. Thereafter, air may be supplied to the pressed stacked body 9 formed of the pressed fuel cell components 3 by the airtightness detection unit 90. The air may be supplied to the pressed stacked body 9 through the press block 45 of the press body 30 and the support body 15 of the stacking guide 10. Therefore, the airtightness detection unit 90 may be configured to measure the amount of air leaking (e.g., discharging) from the pressed stacked body 9, to determine whether the fuel cell components 3 have defective airtight seal.

As described above, when a degree of airtightness of the pressed stacked body 9 is acceptable (e.g., the air leak is minimal or inconsequential) after detection of the airtightness of the pressed stacked body 9 by the airtightness detection unit 90, the fastening pins 75 may be fastened to the pin apertures 71 of the lower end portions of the fixing rods 70 disposed within (e.g., fitted into) the coupling apertures 23 of the lift plate 20. In particular, the fastening pin 75 may be fastened to the pin aperture 71 of the fixing rod 70 in the front and rear direction of the pressed stacked body 9 through the pin supporting groove 16 disposed in the support body 15 of the stacking guide 10.

Therefore, in the exemplary embodiment of the present invention, the fuel cell components 3 may be pressed by the press body 30 inside the stacking guide 10. Further, the press body 30 and the lift plate 20 may be integrally coupled by the fixing rods 70 with the pressed stacked body 9 formed of the fuel cell components 3 disposed therebetween. In other words, in the exemplary embodiment of the present invention, the pressed stacked body 9 may be maintained in a pressed state separately from the stacking guide 10 by the fixing rods 70 between the rotary member 49 of the press body 30 and the lift plate 20.

Figure 11:
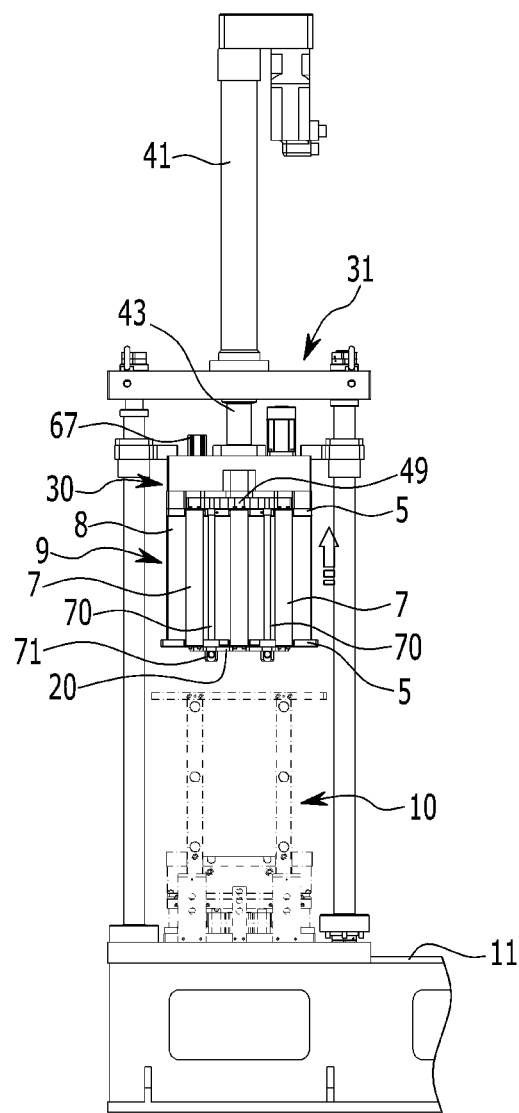

In the exemplary embodiment of the present invention, when the press body 30 and the lift plate 20 are integrally coupled by the fixing rods 70 with the pressed stacked body 9 disposed therebetween as described above, the operating rod 43 of the press cylinder 41 may operate rearward to move the press body 30 in the upward direction as illustrated in FIG. 11. Additionally, the pressed stacked body 9, may be maintained in a pressed state separately from the stacking guide 10 by the fixing rods 70 between the press body 30 and the lift plate 20, translate (e.g., moves) to the upper side of the stacking guide 10 by the press body 30.

During the movement of the pressed stacked body 9 to the upper side of the stacking guide 10 as described above, the insulating plate 8 may be mounted on the front surface of the pressed stacked body 9, the fastening member 7 may be mounted on the front surface of the pressed stacked body 9, and the upper and lower end plates 5 of the pressed stacked body 9 may be coupled (e.g., fastened) by the fastening member 7. During this process, the stacking guide 10 may be conveyed to the exterior of the press frame 31 along the conveying route of the base frame 11.

When the insulating plate 8 and the fastening member 7 are mounted on the front surface of the pressed stacked body 9 as described above, in the exemplary embodiment of the present invention, the stopping rod 69 of the stopper cylinder 67 may operate rearward to release the restriction of the rotary member 49. In other words, the stopping rod 69 of the stopper cylinder 67 may be withdrawn from the stopping groove 49d of the rotary member 49 while operating rearward, thereby releasing the restriction of the rotary member 49.

Figure 12:
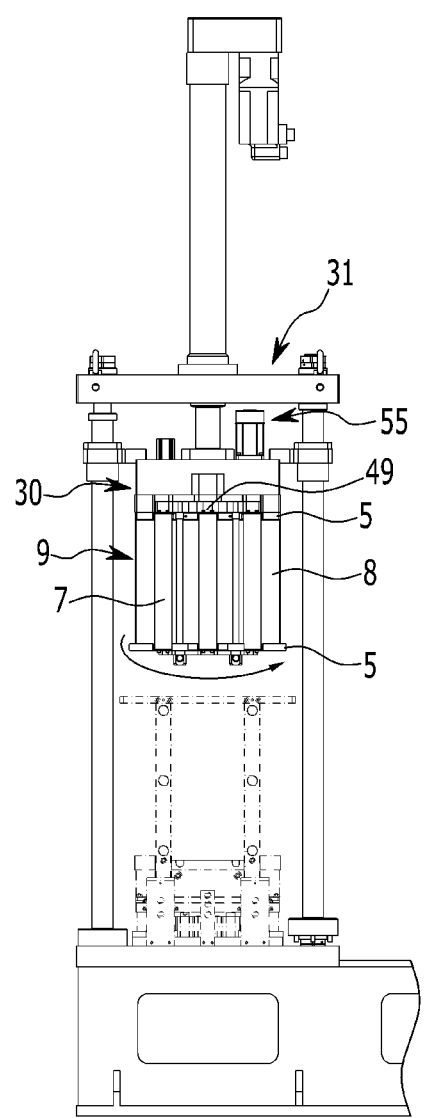

Thereafter, in the exemplary embodiment of the present invention, the drive unit 55 may be configured to rotate the rotary member 49 of the press body 30 by about 180 degrees as illustrated in FIG. 12. Therefore, in the exemplary embodiment of the present invention, the insulating plate 8 and the fastening member 7 may be mounted on the rear surface of the pressed stacked body 9, and the upper and lower end plates 5 of the pressed stacked body 9 may be fastened by the fastening member 7.

When the insulating plates 8 and the fastening member 7 are mounted on the front and rear surfaces of the pressed stacked body 9 as described above, in the exemplary embodiment of the present invention, the operating rod 43 of the press cylinder 41 may operate forward to translate (e.g., move) the pressed stacked body 9, together with the press body 30, in the downward direction. Thereafter, when the fastening pins 75 are removed from the lower end portions of the fixing rods 70 the press body 30 may move in the upward direction by the press cylinder 41, in the exemplary embodiment of the present invention. The insulating plates 8 and the fastening member 7 may be mounted on the front and rear surfaces of the pressed stacked body 9 formed of the pressed fuel cell components 3, thereby forming a complete assembly.

According to the apparatus 100 for assembling the fuel cell stack according to the exemplary embodiment of the present invention, which has been described above, airtightness of the pressed stacked body 9 may be detected before the fastening member 7 are attached to the pressed stacked body 9. The pressed stacked body 9 may be attached by the fastening member 7 while maintaining a pressed state of the fuel cell components 3. Therefore, in the exemplary embodiment of the present invention, since the pressed stacked body 9, which is maintained in a pressed state by the lift plate 20, the press body 30, and the fixing rods 70, may be fastened, the likelihood of a leak of the fuel cell stack 1 caused by a change in repulsive force of the pressed stacked body 9 may be reduced the assembly processes may be simplified, and the assembly time may be reduced, thereby improving assembly productivity of the fuel cell stack 1.

Additionally, in the exemplary embodiment of the present invention, the pressed stacked body 9 may be fastened while being rotated when the pressed stacked body 9, maintained in a pressed state by the lift plate 20, the press body 30, and the fixing rods 70, is elevated (e.g., lifted up), thereby improving convenience in fastening the fuel cell stack. Furthermore, in the exemplary embodiment of the present invention, airtightness of the pressed stacked body 9 may be detected by the airtightness detection unit 90 prior to fastening the pressed stacked body 9, which is maintained in a pressed state, and as a result, the requirement to disassemble the fuel cell stack and then reassemble the fuel cell stack when the fuel cell components 3 have a defect in airtightness may be reduced.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1 . . . Fuel cell stack
3 . . . Fuel cell components
5 . . . End plate
7 . . . Fastening member
8 . . . Insulating plate
9 . . . Pressed stacked body
10 . . . Stacking guide 11 ... Base frame
13 ... Bottom body
15 ... Support body
16 ... Pin supporting groove
17 ... Guide body
19 ... Open frame
20 ... Lift plate
21 ... protrusion
23 ... Coupling aperture
30 ... Press body
31 ... Press frame
33 ... Lower plate
35 ... Guide rod
37 ... Upper plate
41 ... Press cylinder
43 ... Operating rod
45 ... Press block
47 ... Support plate
49 ... Rotary member
49a ... Rounded portion
49b ... Coupling portion
49c ... Fixing aperture
49d ... Stopping groove
51 ... Support end
53 ... Guide block
55 ... Drive unit
57 ... Drive motor
58 ... Driving shaft
59 ... Rotary shaft
61 ... Driving gear
63 ... Driven gear
65 ... Idle gear
67 ... Stopper cylinder
69 ... Stopping rod
70 ... Fixing rod
71 ... Pin aperture
75 ... Fastening pin
90 ... Airtightness detection unit G ... gap

What is claimed is:

1. An apparatus for assembling a fuel cell stack, which exerts a force on fuel cell components stacked on a stacking guide, and couples a pressed stacked body formed of the pressed fuel cell components by a fastening member, the apparatus comprising:
a lift plate disposed at a bottom side of the stacking guide to be movable in a vertical direction;
a press body disposed on a press frame to translate in the vertical direction, and exert a force on the fuel cell components stacked on the lift plate; and
a plurality of fixing rods positioned on the press body and configured to be coupled to the lift plate to allow the pressed stacked body between the lift plate and the press body to be movable together with the lift plate and the press body in the vertical direction,
wherein the press body includes a rotary member coupled to upper end portions of the fixing rods to be rotatable by a drive unit, and
wherein a stopper cylinder configured to restrict the rotary member is installed on the press body.

2. The apparatus of claim 1, wherein the rotary member is rotated by the drive unit to allow for the fastening member to be coupled to the pressed stacked body when the pressed stacked body, coupled between the rotary member and the lift plate by the fixing rods, is lifted to an upper side of the stacking guide by the press body.

3. The apparatus of claim 1, wherein the drive unit includes:
a drive motor fixedly installed on the press body; and
a rotary shaft coupled at a rotation center of the rotary member, and coupled to a driving shaft of the drive motor.

4. The apparatus of claim 3, wherein a driving gear is coupled to the driving shaft, a driven gear is coupled to the rotary shaft, and the driving gear and the driven gear are connected to each other by at least one idle gear.

5. The apparatus of claim 4, wherein the driving shaft, the rotary shaft, and the idle gear are rotatably disposed on a support plate fixed to the press body.

6. The apparatus of claim 1, wherein the stopper cylinder includes:
a stopping rod selectively coupled to a stopping groove disposed within the rotary member by operating forward and rearward in the vertical direction.

7. The apparatus of claim 1, wherein:
the press body includes support ends which support both sides of an upper portion of the pressed stacked body, and
the rotary member is rotatably installed between the support ends, and exerts a force on a portion between both sides of the upper portion of the pressed stacked body.

8. The apparatus of claim 7, wherein rounded portions are formed at a plurality of sides of the rotary member that correspond to the support ends.

9. The apparatus of claim 7, wherein the rotary member includes coupling portions to which upper ends of the fixing rods are coupled.

10. An apparatus for assembling a fuel cell stack, which exerts a force on fuel cell components stacked on a stacking guide, and couples a pressed stacked body formed of the pressed fuel cell components by a fastening member, the apparatus comprising:
a lift plate disposed at a bottom side of the stacking guide to be movable in a vertical direction;
a press body disposed on a press frame to translate in the vertical direction, and exert a force on the fuel cell components stacked on the lift plate; and
a plurality of fixing rods positioned on the press body and configured to be coupled to the lift plate to allow the pressed stacked body between the lift plate and the press body to be movable together with the lift plate and the press body in the vertical direction,
wherein the press body includes a rotary member coupled to upper end portions of the fixing rods to be rotatable by a drive unit, and
wherein the lift plate includes coupling apertures which have a shape that correspond to the rotary member and into which lower ends of the fixing rods are fitted.

11. The apparatus of claim 10, wherein
pin apertures are formed in lower end portions of the fixing rods, and
a fastening pin, which couples a pair of adjacent fixing rods in a front and rear direction of the pressed stacked body, is fastened to the pin apertures.

12. The apparatus of claim 11, wherein
one pair of fixing rods is coupled to a front edge portion of the rotary member that corresponds to a front surface of the pressed stacked body, and
a second pair of fixing rods is coupled to a rear edge portion of the rotary member that corresponds to a rear surface of the pressed stacked body.

13. The apparatus of claim 11, wherein the fastening pin is attached to the pin apertures in the front and rear direction of the pressed stacked body through a pin supporting groove disposed in a bottom surface of the stacking guide.

14. An apparatus for assembling a fuel cell stack, which exerts a force on fuel cell components stacked on a stacking guide, and couples a pressed stacked body formed of the pressed fuel cell components by a fastening member, the apparatus comprising:
a lift plate disposed at a bottom side of the stacking guide;
a press body installed on a press frame to be movable in a vertical direction, and exerts a force on the fuel cell components stacked on the lift plate;
a plurality of fixing rods installed on the press body, fastened to the lift plate, and couples the press body integrally to the lift plate with the pressed stacked body disposed therebetween; and
an airtightness detection unit installed to be connected with the press body and the stacking guide, and configured to detect airtightness of the pressed stacked body by supplying a fluid to the pressed stacked body when the fuel cell components are pressed by the press body,
wherein the airtightness detection unit is configured to supply air to the pressed stacked body through the press body and the stacking guide, and configured to measure the amount of air that leaks.

* * * * *